(12) United States Patent
Chung et al.

(10) Patent No.: US 6,642,987 B2
(45) Date of Patent: Nov. 4, 2003

(54) BUILT-IN SPACERS FOR LIQUID CRYSTAL ON SILICON (LCOS) DEVICES

(75) Inventors: David B. Chung, Cupertino, CA (US); Michael Kozhukh, Palo Alto, CA (US); Sergei Rutman, Boulder Creek, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/956,626

(22) Filed: Sep. 19, 2001

(65) Prior Publication Data

US 2003/0053023 A1 Mar. 20, 2003

(51) Int. Cl.[7] .............................................. G02F 1/1339
(52) U.S. Cl. ........................ 349/155; 349/113; 349/156
(58) Field of Search ................................. 349/155, 156, 349/113, 106, 42, 43, 44

(56) References Cited

U.S. PATENT DOCUMENTS

| | | | | |
|---|---|---|---|---|
| 5,764,324 A | * | 6/1998 | Lu et al. ...................... | 349/113 |
| 5,978,063 A | * | 11/1999 | Crawford et al. ........... | 349/155 |
| 6,040,888 A | * | 3/2000 | Masami et al. .............. | 349/155 |
| 6,124,912 A | * | 9/2000 | Moore ......................... | 349/113 |
| 6,140,988 A | * | 10/2000 | Yamada ....................... | 345/88 |
| 6,317,188 B1 | * | 11/2001 | Shibahara .................... | 349/155 |
| 6,429,921 B1 | * | 8/2002 | Chen et al. .................. | 349/155 |
| 6,437,847 B1 | * | 8/2002 | Kishimoto ................... | 349/155 |
| 6,459,468 B2 | * | 10/2002 | Shibahara .................... | 349/155 |

* cited by examiner

Primary Examiner—Kenneth Parker
Assistant Examiner—David Chung
(74) Attorney, Agent, or Firm—Blakely, Sokoloff, Taylor & Zafman LLP

(57) ABSTRACT

Liquid crystal on silicon (LCOS) cells include a plurality of pixel elements formed between substrates. Spacers are formed on a portion of some of the pixel elements and positioned in the cell gap. The spacers on each of these LCOS cells reflecting different colors are formed in different locations in each cell. The result is that substantially none of the spacers create overlapping dead spots in a composite image. The spacers are further distributed among these pixel elements such that spacers are absent from some pixel elements and such that there is a substantially uniform thickness in the cell gaps. The reduced severity of the dead spots in the composite image as a result of the spacers in different locations, the reduced size and number of the spacers, and the uniformity in the cell gaps provide higher optical image quality.

9 Claims, 4 Drawing Sheets

BUILT-IN SPACERS FOR LIQUID CRYSTAL ON SILICON (LCOS) DEVICES

TECHNICAL FIELD

This disclosure relates generally to fabrication of optical devices, and in particular but not exclusively, relates to fabrication and placement of spacers in an optical projection device, such as a device having liquid crystal on silicon (LCOS) light modulators.

BACKGROUND

LCOS devices, such as LCOS light modulators, are an important component of an optical projection system. LCOS devices, typically embodied in chips for use as "micro-display screens," can eventually substitute for cathode ray tubes (CRTs) for a monitor or for a television.

One of the important parameters for a high quality LCOS device is the uniformity of the cell gap (sometimes referred to as the "cell spacing") in the LCOS device (e.g., the LCOS "cell"). In an LCOS device, the cell gap is the space between the upper and lower substrates of the device, with the liquid crystal material being contained within the cell gap. For liquid crystal displays (LCDs), the upper and lower substrates are typically made from a glass material. For LCOS devices, the upper substrate is made from glass, and the lower substrate is made from silicon.

It is common knowledge that a consistency in the thickness and/or uniformity of the liquid crystal material within the cell gap must be achieved in order to obtain a high-quality optical image on the screen. If there is non-uniformity, then colors that should be red may suffer a discernible color shift, for instance, in the display. Spacers are used to help achieve this uniformity—the spacers act as a structural support between the upper and lower substrates to keep the cell gap between the substrates uniform in thickness.

In the manufacturing of LCDs, the practice is to apply spacers having sizes of 3–5 microns in width (either through a wet or dry process) within the cell by spraying the spacers onto the lower substrate, before coupling on the upper substrate with gasket material to form a hermetic seal. Thereafter, liquid crystal is deposited in the cell gaps formed between the spacers and the substrates, via use of vacuum processes.

This spacer manufacturing technique, however, produces unsatisfactory results for LCOS devices. This is because while human eyes cannot gauge actual sizes of the spacers, the spacers sprayed on a small LCOS chip will be enlarged hundreds of times in the projection image. The spacers create "dead spots" in the resulting image. The spacers become so obvious that the resulting image is undesirable, and the LCOS product will not sell well in the marketplace.

Because the visible spacers in the viewing area degrade from the quality of the LCOS device, many commercially available LCOS devices are fabricated without spacers (e.g., are "spacerless"). However, this process is not a guarantee for quality or yield—because with larger size variations of silicon substrates or with thinner cell gaps, it is mechanically difficult to support constant spacing uniformity when coupling two large substrates. In fact, this can become a serious issue if yield is significantly reduced due to the higher number of LCOS devices that will need to be discarded for having poor uniformity.

To alleviate this problem for LCOS devices, techniques using inherited built-in spacers have been used. Such inherited built-in spacers are formed by etching $SiO_2$ spacers on the silicon substrate itself. However, while the resulting structure does achieve uniformity of the cell gap and thus uniformity of the image quality, the spacers are too glaringly obvious as viewers pay more attention and get closer to the image. In other words, the spacers are relatively large in size and are often formed on each and every pixel in many types of LCOS cells, and as a result, become very visible when the image is magnified. The individual image generated from each cell is peppered with "dead spots" caused by the spacers in that cell, and these dead spots become much more pronounced when a composite/combined image is obtained from individual images from multiple cells, since the dead spots exactly overlap/superimpose over each other in the combined image.

Attempts to address this dilemma include fabrication of cells where the spacers are not formed on every pixel—the overall number of spacers is reduced. However, the spacers that are formed are nevertheless formed in the same pixel location on every cell. Thus, while the overall number of dead spots that "pepper" the original image may be reduced, the severity of the dead spots from the existing spacers remains unchanged, since the combined image still exactly superimposes and combines the dead spots from each cell. The overall image quality is therefore still unacceptable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method to fabricate and distribute/place spacers in optical devices are described herein. In the following description, numerous specific details are provided, such as example dimensions or materials, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides LCOS devices (e.g., LCOS cells), such as light modulators, having inherited built-in spacers positioned at different pixel locations for each red, green, blue (RGB) color cell. With this embodiment, the spacers in one cell have locations that are different than the locations of spacers in the other cells. The combined image from the cells will therefore have less severe "dead spots" since the dead spots caused by each spacer do not overlap/combine in the combined image. Moreover, the spacers can have an optimized spatial distribution separately for R, G, B cells respectively, such that spacers are not present on every pixel element of these cells. Thus, the spacers are less visible, and as result of this, high image quality is achieved (e.g., decreased optical deficiencies), with high yield in the manufacturing of LCOS devices and lower costs.

The spacers can be made from silicon nitride $Si_3N_4$ in one embodiment, which is more transparent than oxide in the visible part of the light spectrum. Moreover, silicon nitride is stronger than oxide, and thus the spacers can be made smaller while still providing comparable support between the substrates for a uniform cell gap.

Figure 1:
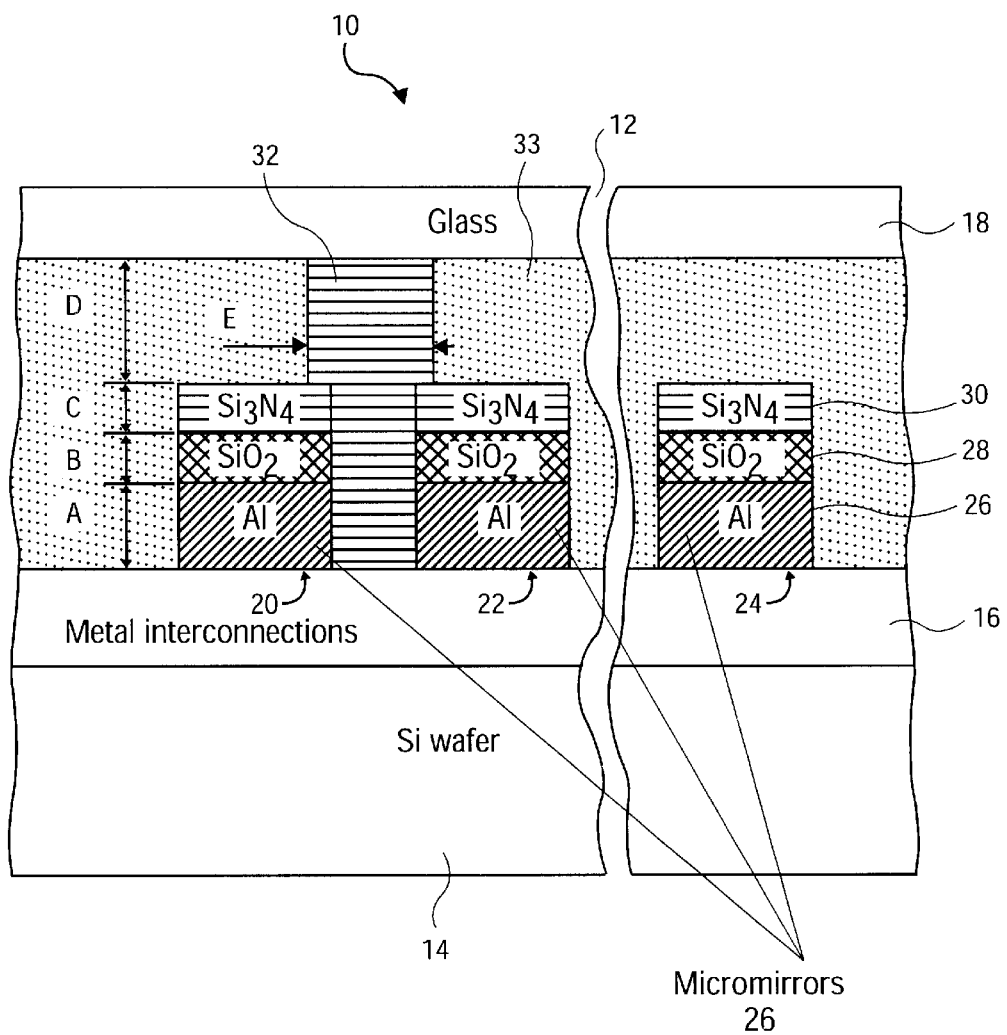
FIG. 1 is a partial cross-sectional view of an LCOS device having spacers in accordance with an embodiment of the invention.

FIG. 1 is a partial cross-sectional view of a single LCOS device 10 having spacers 32 in accordance with an embodiment of the invention. That is, the view in FIG. 1 shows a fragment of the LCOS device 10 (as indicated by a break 12 and by breaks at the lateral edges of the drawing) and shows the relative positions of its various components. It is to be appreciated that these various components are not necessarily drawn to exact scale and shape in FIG. 1, and may be exaggerated for purposes of illustration, as is commonly done when providing illustrations of semiconductor components.

The LCOS device 10 can comprise part of an optical projection device in one embodiment, and may be embodied as a chip integrated with the optical projection device. In an embodiment, the LCOS device 10 can comprise an LCOS light modulator, such as an LCOS cell to reflect a single color, such as R, G, or B (or other color pattern scheme). It is to be appreciated that in other embodiments, the LCOS device 10 may be used in connection with other types of optical devices. These optical devices can include, but not be limited to, rear and front-end projectors, virtual near-to-eye LCOS applications/products, and so on.

The LCOS device 10 includes a first substrate 14 and a second substrate 18. The first substrate 14 can be made from silicon in one embodiment, while the second substrate 18 can be made from a suitably transparent material, such as glass or plastic. A metal interconnections layer 16 may be formed over the first substrate 14 to provide electronic circuitry and electronic control for the various components between the substrates 14 and 18.

A plurality of pixel elements is formed between the substrates 14 and 18. For purposes of illustration in FIG. 1, only three pixel elements 20, 22, and 24 are shown, and it is to be appreciated that the LCOS device 10 can have many more pixel elements, such as, for example, a 640×480 pixel display. As shown in FIG. 1, the pixel elements 20, 22, and 24 are separated.

The pixel elements 20, 22, and 24 each include a micromirror layer 26 formed over the first substrate 14 (and over the metal interconnections layer 16 contained in oxide layers, developed on top of silicon Si, for instance). The micromirror layer 26 can be made from aluminum Al in one embodiment or from some other suitable reflective material. An example thickness A of the micromirror layer 26 is approximately 1500 Angstroms in one embodiment, and it is to be appreciated that other embodiments may have a different thickness A for the micromirror layer 26.

A protective layer 28 (which is simultaneously one of the antireflective layers) is formed over the micromirror layer 26 to protect the micromirror layer 26. The protective layer 28 can be made from silicon dioxide $SiO_2$ in one embodiment or from some other suitable material. An example thickness B of the protective layer 28 is approximately 750 Angstroms in one embodiment, and it is to be appreciated that other embodiments may have a different thickness B for the protective layer 28.

An additional antireflective layer 30 is formed over the protective layer 28. The antireflective layer 30 can be made from silicon nitride $Si_3N_4$ in one embodiment or from some other suitable material. An example thickness C of the antireflective layer 30 is approximately 750 Angstroms in one embodiment, and it is to be appreciated that other embodiments may have a different thickness C for the antireflective layer 30.

A plurality of spacers 32 is formed on a portion of some of the pixel elements, and positioned in cell gaps between these pixel elements and the second substrate 18. That is, the spacers 32 are positioned in the cell gaps (defined by a thickness D between the antireflective layer 30 and the second substrate 18) of some of the pixel elements of the LCOS device 10, such as the pixel elements 20 and 22 in FIG. 1.

The plurality of spacers 32 is distributed among these pixel elements in a manner that spacers 32 are absent from other pixel elements (such as the pixel element 24) and in a manner that provides a substantially uniform thickness D of the cell gaps. The substantially uniform thickness D of the cell gaps results in a substantially uniform thickness (and consistency) of liquid crystal material 33 contained in the cell gaps.

In an embodiment, the spacers 32 comprise "pillars" positioned on their corresponding pixel elements. The pillars can have an example height D of approximately 1.8 microns in one embodiment. These pillars can have a width E of approximately 3 microns (for a cross section of approximately 3×3 microns$^2$) in one embodiment, and it is to be appreciated that the width E can vary between 1 and 3 microns according to various other embodiments Because the pixel elements 20 and 24 can have a cross section of 14×14 microns in one embodiment, the spacers 32 have a dimensional width that is substantially smaller than the dimensional width of these pixel elements. This significant difference in cross section dimensions makes the spacers 32 less visible (and so better image quality is achieved).

The spacers 32 can be made from silicon nitride $Si_3N_4$ in one embodiment, and hence can be formed with the same material as the antireflective layer 30. Silicon nitride is used instead of silicon dioxide because silicon nitride is a stronger material. Therefore, smaller sizes of the silicon nitride spacers 32 can be achieved, while providing structural strength that is comparable to larger silicon dioxide spacers (that are placed on every pixel element in accordance with existing methods).

In an embodiment, the pixel elements of the single LCOS device 10 together comprise pixels capable to reflect a single color, such as red, while other LCOS devices 10 in the same apparatus each reflect other different colors, such as green and blue. Together, these RGB cells create a composite image. It is understood that other color schemes may implement an embodiment of the invention. In such embodiments, the spacers 32 can be formed in different locations in each cell for different colors, such that an optimized spatial distribution of spacers 32 can be obtained for the RGB cells, while minimizing the number of spacers 32 formed. Because of the different locations of the spacers 32 in each cell, the composite image will not have overlapping dead spots from each cell.

Figure 2:
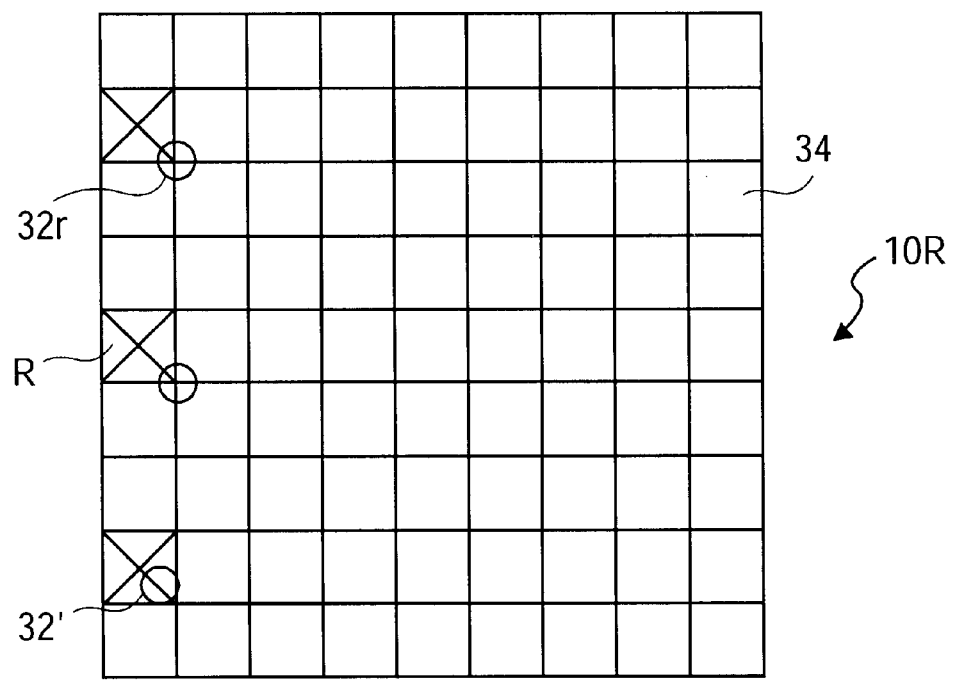
FIGS. 2–4 are partial top views showing example distributions of spacers for three different LCOS devices for three different colors in accordance with an embodiment of the invention.
Figure 3:
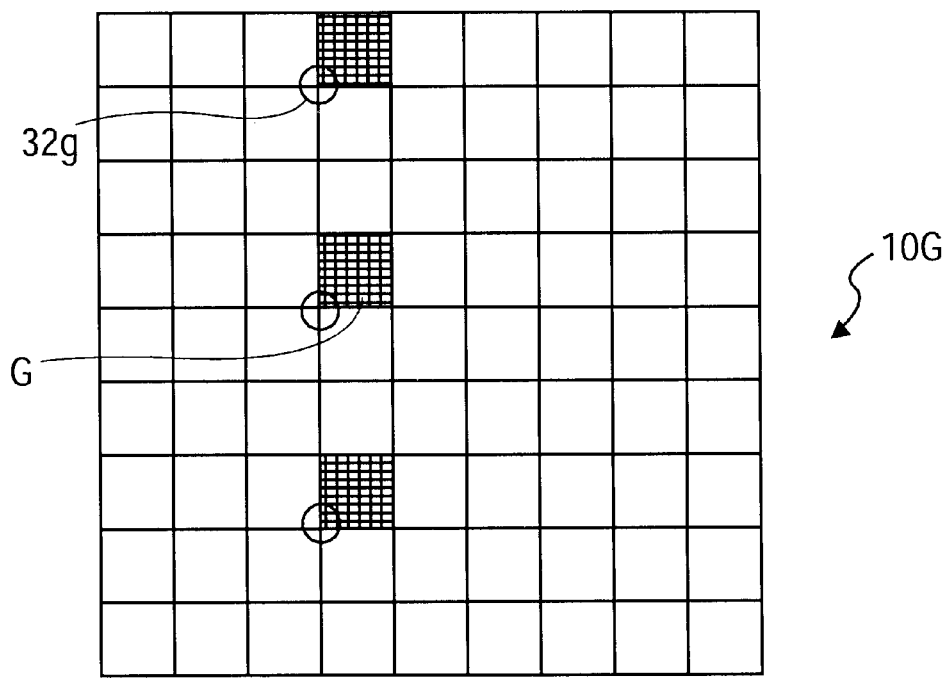
Figure 4:
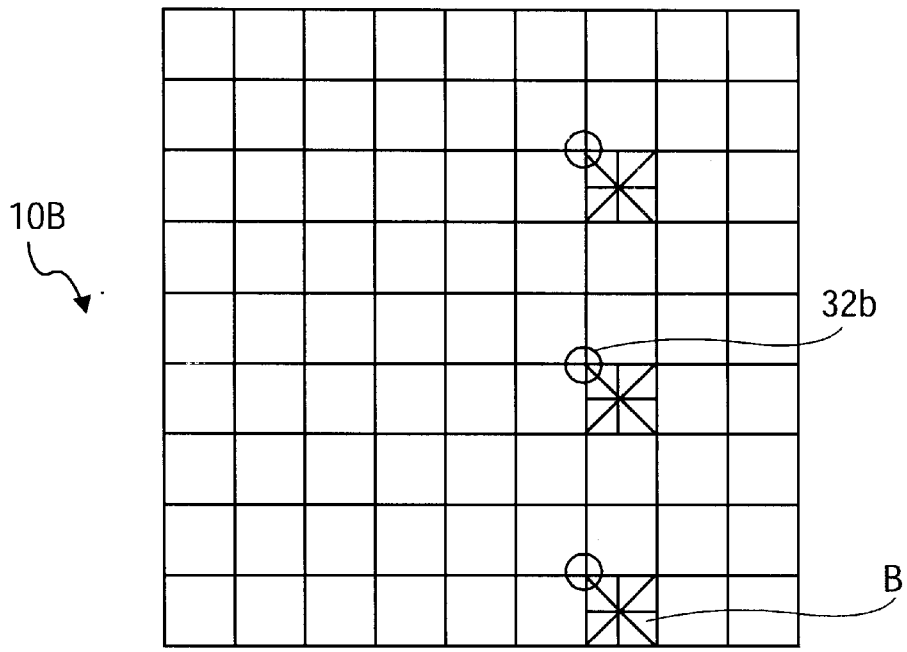

FIGS. 2–4 illustrate this concept in further detail, for an example embodiment based on an RGB scheme. That is, FIGS. 2–4 are partial top views showing example distributions of spacers for three different LCOS devices for three different colors according to an embodiment of the invention. FIG. 2 is a top view of a portion (e.g., 9×9 pixels) of an LCOS device 10R illustrating an example distribution of spacers 32r (shown as circles) for a cell that reflects red light. FIG. 3 is a top view of a portion of an LCOS device 10G illustrating an example distribution of spacers 32g for a cell that reflects green light. FIG. 4 is a top view of a portion of an LCOS device 10B illustrating an example distribution of spacers 32b for a cell that reflects blue light. For simplicity of illustration, only three spacers are shown in each of the FIGS. 2–4.

The pixels that have spacers 32 formed thereon are shown as shaded squares. For clarity of illustration, however, the embodiments shown in these figures have only a single shaded pixel in each group of four pixels that share a common spacer. Other pixels that generally do not have spacers formed thereon are shown as un-shaded squares, such as the pixel 34 in FIG. 2. Therefore, the pixels that are shaded can represent the pixel elements 20 or 22 of FIG. 1, while the un-shaded RGB pixels 34 can represent the pixel element 24.

For purposes of explanation only in FIGS. 2–4, it is assumed that the spacers 32 have a dimension of approximately 3×3 microns, the pixels have a dimension of approximately 14×14 microns, and a separation of approximately 0.5 microns is present between the pixels. Moreover, it is assumed that the spacers 32 are distributed such that they are separated from each other by approximately 50 microns—although according to various embodiments, this separation can vary between 50 and 100 microns. For purposes of simplicity of illustration, however, additional intervening un-shaded pixels 34 (located between spacers 32 and having 14-micron widths) are not drawn in FIGS. 2–4 to fully represent the 50-micron separation between spacers 32.

As shown in the embodiment of FIGS. 2–4, the spacers 32 need not be formed on every pixel. Rather, the spacers 32 can be distributed among the different pixels, such that the approximately 50-micron separation between spacers 32 is generally maintained and such that spacers 32 are formed in different locations for cells that reflect different colors. For instance, the spacers 32r can be formed in a location that is different relative to the location of the spacers 32g and 32b, such that no two or three spacers overlap in location in the composite image. It is to be appreciated, however, that in some situations, there may be several spacers that do overlap, albeit most of the spacers are non-overlapping.

In the example embodiments of FIGS. 2–4, each individual spacer 32 is formed on corner portions of four pixel elements (or pixels). With this technique, the number of total spacers 32 is reduced since there need not be a 1-to-1 correspondence between an individual spacer 32 and an individual R, G, or B pixel that is to have that spacer 32 formed thereon (e.g., there is a 1-to-4 correspondence instead). Moreover, placement of the spacers 32 at the corners results in smaller portions of the spacers 32 that impinge on the active areas of the corresponding RGB pixels, since a portion of the spacers 32 are positioned within the 0.5-micron separations between the RGB pixels. That is, for example, only 1.25 microns of the 14-micron wide pixels will be occupied by the 3-micron wide spacers 32 (e.g., 3 microns–0.5 microns*0.5=1.25 microns). With less of the spacers 32 impinging on the pixels' active areas, less of the spacers 32 will be undesirably visible.

Of course, it is to be appreciated that the spacers 32 need not be formed on corner portions of four pixels in some embodiments. The spacers 32 can be formed on other portions of one pixel, two pixels, or three pixels. For instance, a single spacer 32' in FIG. 2 is shown as being formed on a lower right corner of a single R pixel. Other arrangements can be used, such as placement of spacers on every other corner, on every third corner, and so on, based on factors that can influence optimization, such as the size of the spacers 32, the number of total pixels, the shape of the spacers 32 (circular, square, elliptical, and so on), the size of the chip of the LCOS device 10, the degree of high quality desired of the image for a particular application, and other factors. What is notable, however, is that most of the spacers 32 will have different locations from one LCOS cell to another.

Figure 5:
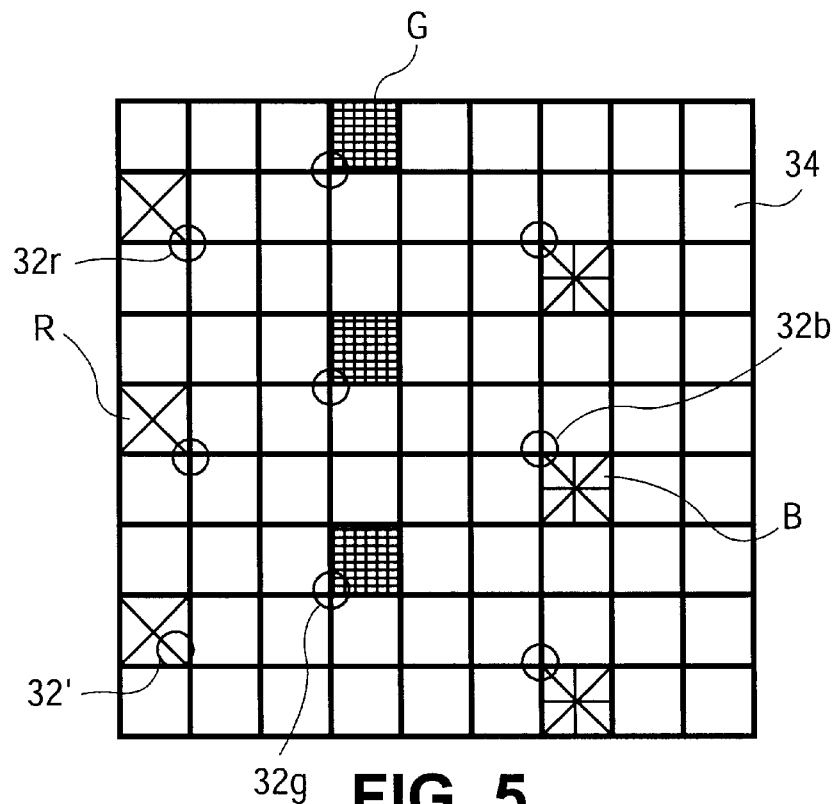
FIG. 5 is a top view illustrating an example distribution of spacers in a composite image for the LCOS devices of FIGS. 2–4 in accordance with an embodiment of the invention.

FIG. 5 is a top view illustrating an example distribution of spacers 32 in a composite image, for the LCOS devices of FIGS. 2–4 in accordance with an embodiment of the invention. That is, FIG. 5 is intended to conceptually illustrate distribution of spacers when the images from the LCOS devices 10R, 10G, and 10B are combined into a composite image. For illustrative purposes only to provide a positional reference, the shading to indicate RGB pixels are duplicated in FIG. 5, and it is understood that the composite image will actually have combined RGB color in these pixel locations. As depicted in FIG. 5, the composite image includes all of the "dead spots" from the spacers 32 from each of the LCOS devices 10R, 10G, and 10B. However, since the spacers 32 are formed in different locations in each of the LCOS devices 10R, 10G, and 10B, the dead spots from these spacers do not combine one on top of another in the composite image. This results in a better quality image.

One embodiment of the invention provides a method to manufacture the LCOS device 10. This manufacturing/fabrication method includes forming the micromirror layer 26 over the first substrate 14 (after the metal interconnections layer 16 has been formed over the first substrate 14). The micromirror layer 26 may be formed by coating or other suitable deposition technique. Next, the protective layer 28 is formed over the micromirror layer 26, using techniques known in the art.

Thereafter, portions of the micromirror layer 26 and the antireflective layer 28 are selectively removed to obtain a plurality of separated pixel elements (such as 20, 22, and 24). This selective removal may be performed via a wet or dry etch or other suitable technique according to various embodiments of the invention. The antireflective layer 30 is then formed over the second antireflective/protective layer 28. In an embodiment, this process step deposits silicon nitride to a thickness of C+D for both the antireflective layer 30 and for the spacers 32.

Subsequently, portions of the antireflective layer 30 are selectively removed from some of the pixel elements to allow pillars to remain on portions of these pixel elements as distributed spacers 32, while pillars are absent on other pixel elements. In one embodiment, this selective removal of portions of the antireflective layer 30 can be performed via a photolithography process followed by a dry etch (in accordance with a desired distribution pattern for the spacers 32). The etching completely removes the $Si_3N_4$ antireflective layer 30 for pixel elements where no pillars are to be present (such as the pixel element 24), leaving only the antireflective layer with the thickness C, while the etching leaves some of the extra material as pillars having a height D for pixel elements where these pillars are to be present (such as the pixel elements 20 and 22).

The second substrate 18 is placed over the spacers 32, with the spacers 32 providing cell gaps between the antireflective layer 30 and the second substrate 18 with a substantially uniform thickness. Thereafter, the cell gaps can be filled with the liquid crystal material 33 prior to placement of the second substrate 18 or after placement of the second substrate 18 (such as via vacuum-filling techniques).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For instance, the spacer 32' of FIG. 2 has been described above as being formed on a single pixel element, rather than being formed on corners of several pixel elements and on the separations/gaps between the pixel elements. It is to be appreciated that several spacers 32' may be formed in this manner, in the same cell as other spacers 32 or in other cells, so long as the locations of the spacers 32' from one cell to another are generally different.

Figure 6:
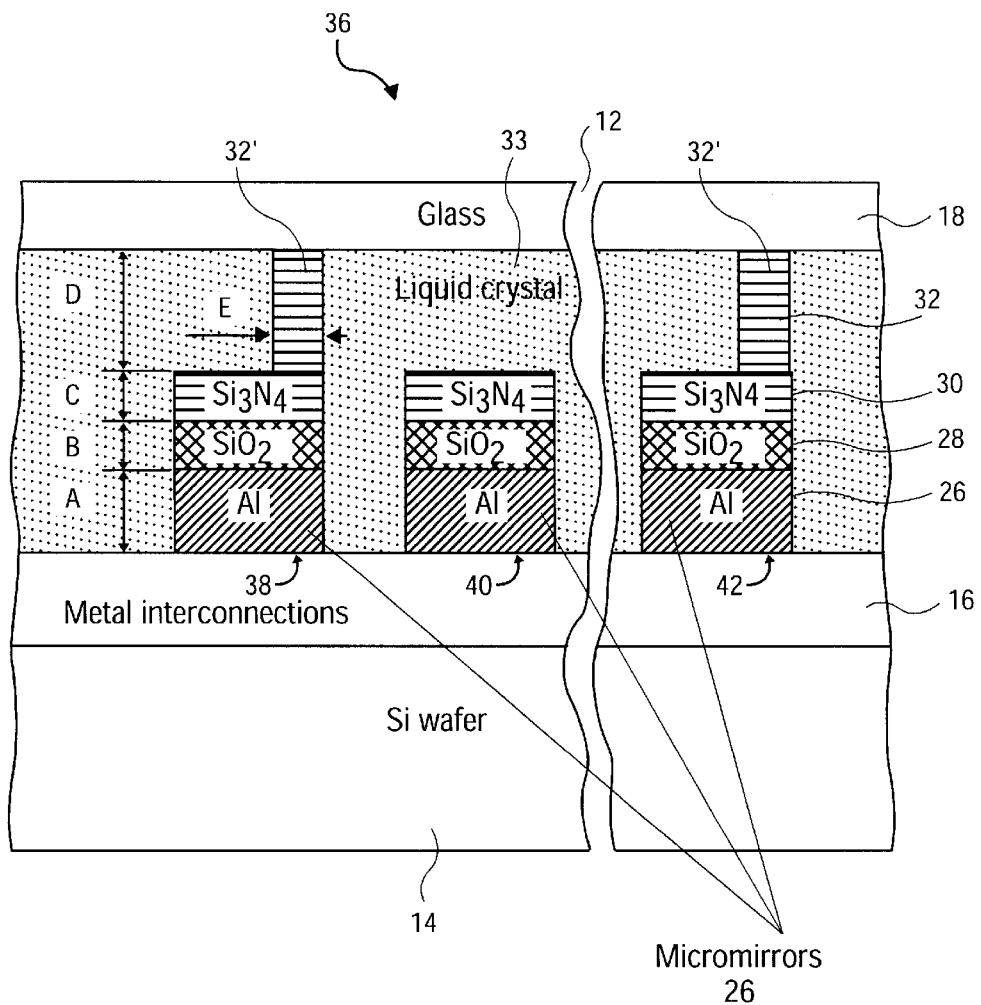
FIG. 6 is a partial cross-sectional view of an LCOS device having spacers in accordance with another embodiment of the invention.

To further illustrate, FIG. 6 is a partial cross-sectional view of a LCOS device 36 having spacers 32' in accordance with another embodiment of the invention. The portion of the LCOS device 36 can comprise a portion of the LCOS device 10 (having the spacers 32' plus the spacers 32 formed in corners of a group of pixel elements, such as shown in FIG. 1), a portion of some other LCOS cell in the same system, or a portion of some other LCOS cell in general. As shown in FIG. 6, the spacers 32' are formed on pixel elements 38 and 42, but not on a pixel element 40, thereby producing a distribution of spacers 32'. The spacers 32' need not necessarily be formed over the separations between the adjacent pixel elements (e.g., between the pixel elements 38 and 40).

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

forming a micromirror layer over a first substrate;

forming a first antireflective layer over the micromirror layer;

selectively removing portions of the micromirror and first antireflective layer to obtain a plurality of separated pixel elements;

forming a second antireflective layer over the first antireflective layer;

selectively removing portions of the second antireflective layer from some of the pixel elements to allow pillars to remain on portions of these pixel elements as distributed spacers, while pillars are absent on other pixel elements; and placing a second substrate over the spacers, the spacers providing cell gaps between the second antireflective layer and the second substrate with a substantially uniform thickness.

2. The method of claim 1, further comprising filling the cell gaps with a liquid crystal material.

3. The method of claim 2 wherein the second substrate is placed over the spacers prior to filling the cell gaps with the liquid crystal material.

4. The method of claim 1 wherein each individual pillar is formed on corner portions of a group of pixel elements.

5. The method of claim 1 wherein the pillars are made from silicon nitride.

6. The method of claim 1 wherein the first substrate is made from silicon.

7. The method of claim 1 wherein the micromirror layer is made from aluminum, and wherein the first antireflective layer is made from silicon dioxide.

8. The method of claim 1 wherein the second antireflective layer is made from silicon nitride.

9. The method of claim 1 wherein at least some of the pillars are each formed on a single pixel element.

* * * * *